(12) United States Patent
Fisher et al.

(10) Patent No.: US 11,471,947 B2
(45) Date of Patent: Oct. 18, 2022

(54) APPARATUS AND METHODS FOR IMPROVEMENT OF SURFACE GEOMETRIES OF INTERNAL CHANNELS OF ADDITIVELY MANUFACTURED COMPONENTS

(71) Applicant: UNITED TECHNOLOGIES CORPORATION, Farmington, CT (US)

(72) Inventors: Brian A. Fisher, West Hartford, CT (US); David W. Morganson, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/433,682

(22) Filed: Jun. 6, 2019

(65) Prior Publication Data
US 2020/0384547 A1    Dec. 10, 2020

(51) Int. Cl.
*B23B 45/00* (2006.01)
*B23B 27/08* (2006.01)
(Continued)

(52) U.S. Cl.
CPC ............ *B23B 27/08* (2013.01); *B23B 45/005* (2013.01); *B33Y 40/00* (2014.12); *F01D 25/00* (2013.01);
(Continued)

(58) Field of Classification Search
CPC ............ B23B 45/005; B23B 2260/036; B23B 2600/068; B23B 39/14; B23B 29/034;
(Continued)

(56) References Cited

U.S. PATENT DOCUMENTS 8,393,242 B2 *   3/2013   Ozaki ................... B23B 45/005
                                                 74/479.01
8,459,373 B2 *   6/2013   Reynolds ................. B25F 5/02
                                                 173/46
(Continued)

FOREIGN PATENT DOCUMENTS

AT      508891      5/2011
EP     2361563      8/2011
(Continued)

OTHER PUBLICATIONS

European Patent Office, European Partial Search Report dated Nov. 19, 2020 in Application No. 20178484.0.
(Continued)

*Primary Examiner* — Eric A. Gates
*Assistant Examiner* — Paul M Janeski
(74) *Attorney, Agent, or Firm* — Snell & Wilmer L.L.P.

(57) ABSTRACT

A cutting system for removing an excess material along a length of a channel constructed using an additive manufacturing process is disclosed. In various embodiments, the cutting system includes a cutter head; a cutter blade attached to the cutter head; a drive cable configured to rotate the cutter head; and a cutter base attached to the cutter head and
(Continued)

having a cutter base outer surface configured to contact an internal surface within the channel to guide the cutter blade against the excess material.

17 Claims, 8 Drawing Sheets

(51) Int. Cl.
    *B33Y 40/00*      (2020.01)
    *F01D 25/00*      (2006.01)
    *B23B 35/00*      (2006.01)
    *B23B 39/14*      (2006.01)

(52) U.S. Cl.
    CPC ............... *B23B 35/00* (2013.01); *B23B 39/14* (2013.01); *B23B 2215/76* (2013.01); *B23B 2260/068* (2013.01); *F05D 2220/32* (2013.01); *F05D 2230/14* (2013.01)

(58) Field of Classification Search
    CPC ........ B23B 29/03464; B23B 29/03421; B23B 29/03457; B23B 29/0346; B23B 45/00; A61B 17/1631; B08B 9/04; B08B 9/043; B08B 9/0436; Y10T 408/665; Y10T 405/557
    See application file for complete search history.

(56) References Cited

U.S. PATENT DOCUMENTS

| | | | |
|---|---|---|---|
| 9,282,976 B2* | 3/2016 | Nishio | B23B 39/14 |
| 9,446,455 B2* | 9/2016 | Gagnon | B23B 45/005 |
| 10,220,444 B2 | 3/2019 | Ott et al. | |
| 2007/0093840 A1* | 4/2007 | Pacelli | A61B 17/1631 |
| | | | 606/80 |
| 2016/0228975 A1 | 8/2016 | Blackmore | |
| 2017/0197284 A1 | 7/2017 | Twelves, Jr. et al. | |
| 2017/0297156 A1* | 10/2017 | Kell | F01D 15/06 |
| 2018/0117731 A1 | 5/2018 | Fielding | |

FOREIGN PATENT DOCUMENTS

| | | |
|---|---|---|
| EP | 2420194 | 2/2012 |
| EP | 2556802 | 2/2013 |
| GB | 2517490 | 2/2015 |

OTHER PUBLICATIONS

European Patent Office, European Search Report dated Feb. 23, 2021 in Application No. 20178484.0.

\* cited by examiner

APPARATUS AND METHODS FOR IMPROVEMENT OF SURFACE GEOMETRIES OF INTERNAL CHANNELS OF ADDITIVELY MANUFACTURED COMPONENTS

FIELD

The present disclosure relates generally to apparatus and methods used to finish internal portions of additively manufactured components and, more particularly, to apparatus and methods used to smooth down-facing surfaces of channels or passageways extending through additively manufactured components.

BACKGROUND

Additive manufacturing processes and techniques enable fabrication of components having geometries that are difficult or otherwise impossible to make using other fabrication techniques. For example, components in gas turbine engines may include complex arrays of internal channels for conveying coolants or lubricants that are difficult or impossible to fabricate using more conventional fabrication techniques, such as casting or molding techniques. Additive manufacturing techniques and related advances facilitate formation of such channels having complex geometries or high-aspect ratios (e.g., channels where the ratio of channel length to a characteristic cross sectional dimension is large). However, because of limitations inherent in the additive manufacturing process, and even in other fabrication processes, various internal surfaces of these channels may exhibit distortions or surface roughness following fabrication. For example, down-facing surfaces of circular or similarly shaped channels may include undesirable distortions or surface roughness resulting from material property variations in the vicinity of the weld pool that occur while generating the overhanging surface (i.e., the down-facing surface) of the channel. Left unimproved, these regions of undesirable distortion or surface roughness have the potential to interfere with fluid flow through the channels of the component when used in operation.

SUMMARY

A cutting system for removing an excess material along a length of a channel constructed using an additive manufacturing process is disclosed. In various embodiments, the cutting system includes a cutter head; a cutter blade attached to the cutter head; a drive cable configured to rotate the cutter head; and a cutter base connected to the cutter head and having a cutter base outer surface configured to contact an internal surface within the channel to guide the cutter blade against the excess material. In various embodiments, the internal surface is an up-facing surface resulting from the additive manufacturing process. In various embodiments, the excess material is disposed on a down-facing surface resulting from the additive manufacturing process. In various embodiments, a fulcrum is disposed upstream of the cutter head. In various embodiments, the fulcrum is configured to rotate with the drive cable.

In various embodiments, a directional cable is configured to direct the cutter head through the channel. In various embodiments, the directional cable is configured to urge the cutter head toward the excess material. In various embodiments, the directional cable is configured to urge the cutter head away from an up-facing surface. In various embodiments, the directional cable is connected to the cutter base. In various embodiments, the directional cable is connected to a cutter pedestal. In various embodiments, the cutter base is configured to rotate relative to the cutter pedestal and the cutter pedestal is configured to remain stationary with respect to the drive cable.

A cutting system for smoothing a down-facing surface of a channel constructed using an additive manufacturing process is disclosed. In various embodiments, the cutting system includes a cutter head; a cutter blade attached to the cutter head; a drive cable configured to rotate the cutter head; and a cutter base connected to the cutter head and having a cutter base outer surface configured to contact an up-facing surface within the channel to guide the cutter blade against the down-facing surface.

In various embodiments, the cutter head is connected to the cutter base via a hinge connecting the cutter base to a cutter pedestal, the cutter head being rotatably connected to the cutter pedestal. In various embodiments, the drive cable is connected to the cutter head and the hinge is configured to transition the cutter head between a cutting configuration and a non-cutting configuration.

In various embodiments, a housing extends along the drive cable and has a first end configured to contact the cutter base while the cutting system assumes a cutting configuration. In various embodiments, an actuator is configured to apply an axial load on the drive cable while the cutting system assumes the cutting configuration. In various embodiments, the housing is configured to rotate with the drive cable.

A method of removing excess material along a down-facing surface of a channel constructed using an additive manufacturing process is disclosed. In various embodiments, the method includes the following steps: rotating a cutter blade within the channel; guiding the cutter blade along a length of the channel using an up-facing surface of the channel; urging the cutter blade toward the down-facing surface to remove the excess material; and urging the cutter blade away from the up-facing surface.

In various embodiments, the steps of urging the cutter blade toward the down-facing surface and urging the cutter blade away from the up-facing surface comprise applying a push-pull action against a directional cable coupled to the cutter blade. In various embodiments, the step of urging the cutter blade toward the down-facing surface comprises transitioning the cutter blade toward a cutter base via a hinge and the step of urging the cutter blade away from the up-facing surface comprises transitioning the cutter blade away from the cutter base via the hinge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
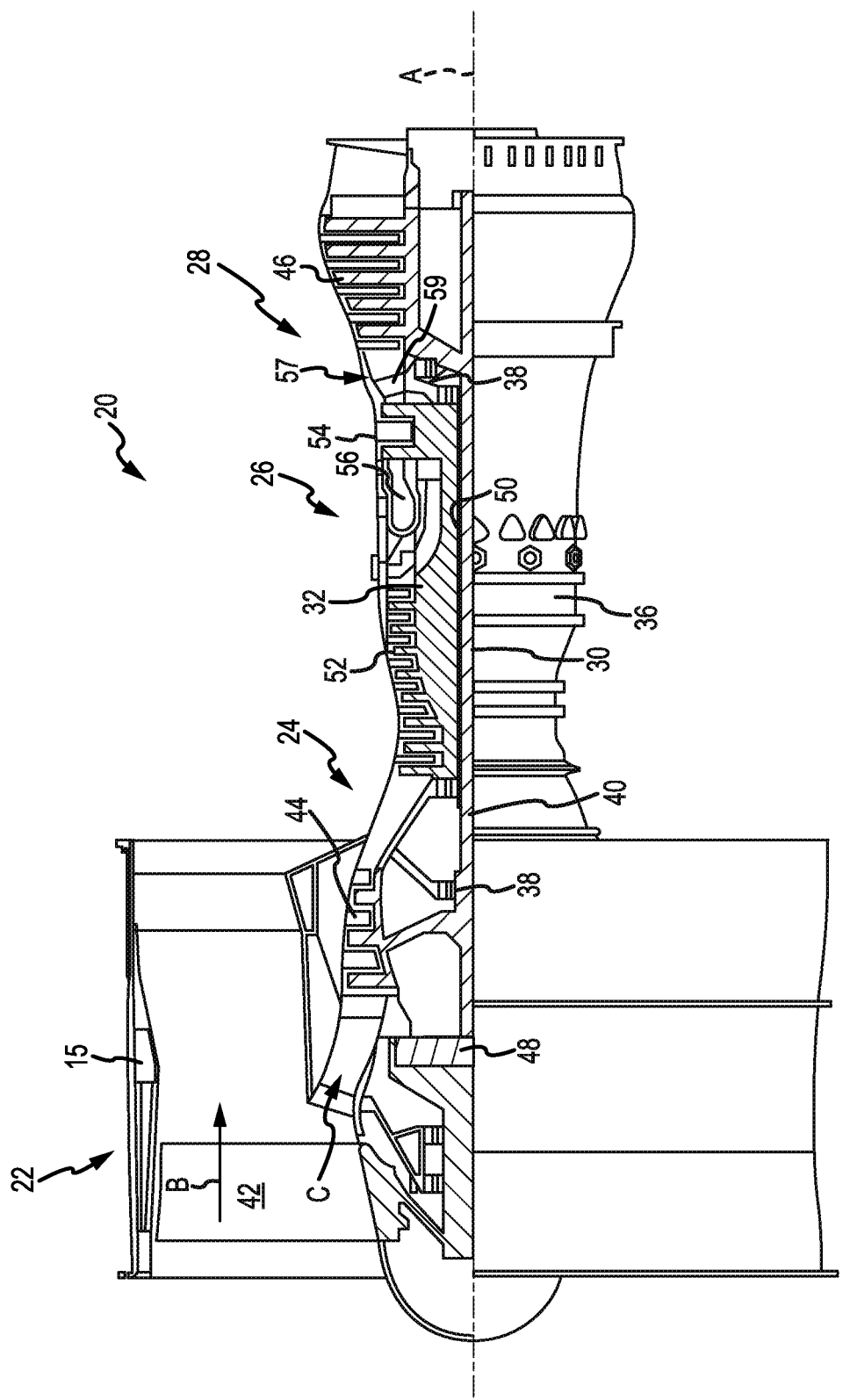
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A (with the arrow pointing in the aft direction) relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Various components of the gas turbine engine 20 include conduits, channels or passageways extending through the component or a portion thereof. For example, components in the gas turbine engine 20 may include internal channels for conveying a coolant. Such components include, for example, the blades and the stators that comprise the compressor and turbine sections described above. Such components may also comprise internal channels for conveying bleed air from the compressor to other areas of the gas turbine engine 20 benefitting from a source of high-pressure cooling fluid. Other components comprising conduits, channels or passageways include the lubrication system, where lubricants are delivered from a pump to bearings and the like. Many of these various components are constructed using additive manufacturing techniques and include conduits, channels or passageways having curved or straight portions or combinations thereof with an internal surface having undesirable roughness or distortion, particularly along a length of a down-facing surface, following the additive manufacturing process.

Figure 2A:
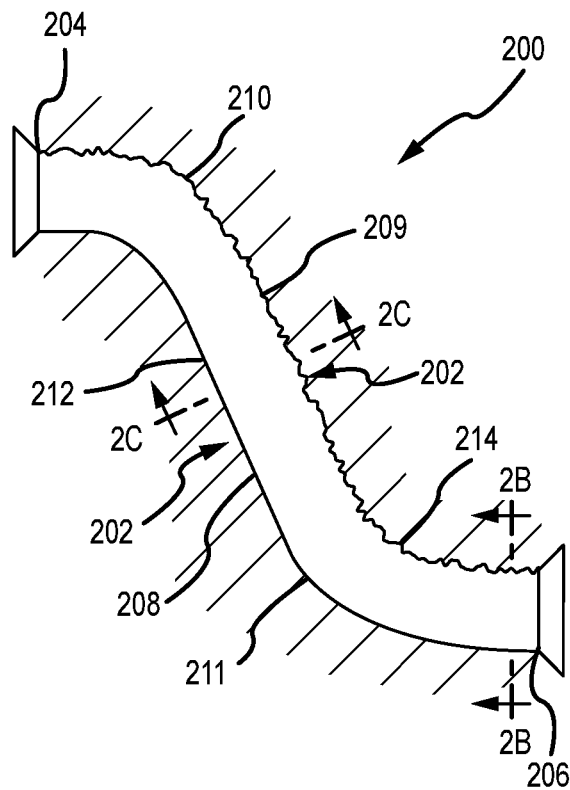
FIG. 2A is a cross sectional schematic view of a channel extending through the interior of an additively manufactured part, in accordance with various embodiments.

Referring now to FIG. 2A, a component 200, fabricated through additive manufacture, is illustrated. The component 200 includes a channel 202 (e.g., an internal channel, conduit or passageway) extending from a first end 204 to a second end 206. The channel 202 is defined by an inner surface 208 that, in various embodiments, is generally circular in cross section from the first end 204 to the second end 206. As illustrated, the inner surface 208 of the channel 202 may be characterized by an undesirable degree of surface roughness along a down-facing surface 209 and an acceptable degree of surface roughness along an up-facing surface 211 following initial fabrication through additive manufacture. To be clear, a down-facing surface refers to a surface of overhang fabricated during the additive manufacturing process, while an up-facing surface refers to a surface of little to no overhang fabricated during the additive manufacturing process. Thus, while a down-facing surface may, in fact, face down—e.g., toward a floor or a base of an additive manufacturing machine—during the additive manufacturing process, the same is not necessarily the case during a post-processing operation where the part may be rotated in an arbitrary direction prior to post-processing or cutting or smoothing as described in detail below.

In various embodiments, the channel 202 is curved at one or more portions along a length defined by an arc-length distance from the first end 204 to the second end 206. As illustrated, for example, the channel 202, in various embodiments, includes a first curved portion 210 downstream (or upstream) of the first end 204, followed by a substantially straight portion 212, and then followed by a second curved portion 214 upstream (or downstream) of the second end 206. In various embodiments, the first curved portion 210 may be characterized such that a line of sight does not exist between the location of the channel 202 where the first curved portion 210 commences and the location of the channel 202 where the first curved portion 210 terminates or where the substantially straight portion 212 commences. A similar characterization applies to the second curved portion 214 or any additional curved portions that may be present in a passageway. The disclosure that follows provides, among other things, apparatus and methods to reduce the surface roughness of the channel 202 within the component 200, or other components having a various numbers of curved or straight passageways. More particularly, the disclosure provides apparatus and methods useful in smoothing distortions or surface roughness along the down-facing surface 209 of the channel 202 using the up-facing surface 211 as a support surface or guide. While the disclosure contemplates smoothing distortions as described above, it is noted that the apparatus and methods described herein may, in various embodiments, be used as a precursor step to subsequent finishing steps that are not typically focused on preferential removal of material from relatively rough, down-facing surfaces. Accordingly, in various embodiments, such a precursor step may be necessary or prove beneficial to the application of subsequent finishing steps where a final channel geometry (including surface smoothness) is achieved with as little subsequent finishing as possible. Further, because subsequent finishing steps typically do not remove material preferentially, there exist certain geometries that require or at least greatly benefit from application of the apparatus and methods described herein as a precursor step to subsequent finishing steps.

Figures 2B, 2C:
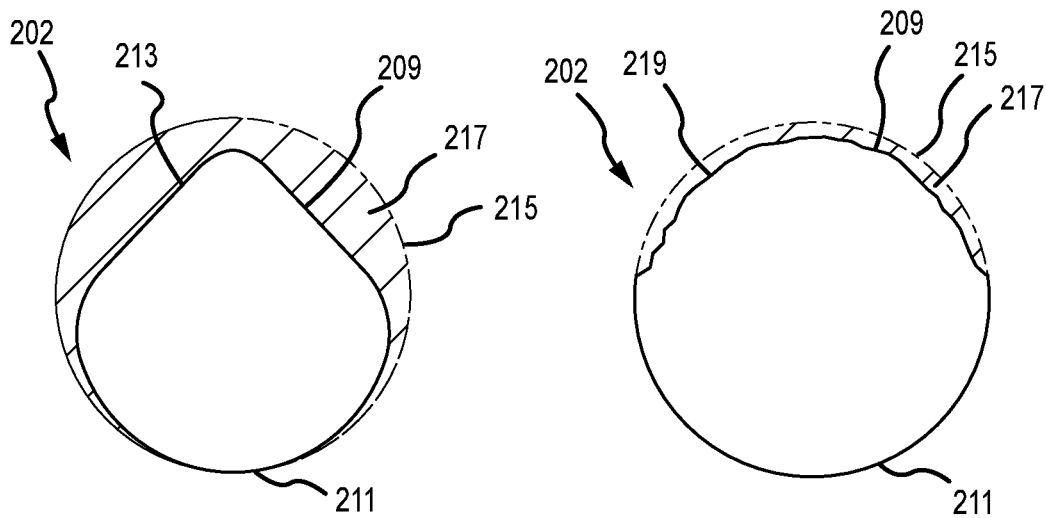
FIGS. 2B and 2C are cross sectional views of the channel illustrated in FIG. 2A, in accordance with various embodiments.

Referring now to FIGS. 2B and 2C, various portions of the down-facing surface 209 and the up-facing surface 211 depicted in FIG. 2A are illustrated schematically in cross section. For example, referring to FIG. 2B, a cross section of the channel 202, including the down-facing surface 209 and the up-facing surface 211, is shown proximate the second end 206. As illustrated, the down-facing surface 209 includes a tear drop surface 213 introduced through the additive manufacturing process. The tear drop surface 213 provides less overhang (or less unsupported downward facing surface) during the additive manufacturing process, so is less prone to developing undesirable surface roughness or is less likely to result in a failed process due to poor melting or improper function of a powder spreading mechanism. Nevertheless, in order to develop a circular cross sectional shape 215 intended for the channel 202 in finished form, an excess material 217 (or a region of excess material) between the tear drop surface 213 and the circular cross sectional shape 215 desired in the final component must be removed. Similarly, referring to FIG. 2C, a cross section of the channel 202, including the down-facing surface 209 and the up-facing surface 211, is shown proximate the substantially straight portion 212. As illustrated, the down-facing surface 209 includes a rough surface 219 introduced through the additive manufacturing process at an overhanging section of the circular cross sectional shape 215 intended for the channel 202 in finished form. While the rough surface 219 more closely approximates the circular cross sectional shape 215 than does the tear drop surface 213, the excess material 217 between the rough surface 219 and the circular cross sectional shape 215 is intended to be removed in order to develop the circular cross sectional shape 215 intended for the channel 202 in finished form. Further, while only the rough surface 219 and the tear drop surface 213 are described above, the disclosure contemplates other surfaces or regions of the channel 202 defining undesirable distortions (whether or not intentionally placed) or regions of undesirable surface roughness (e.g., where a rough surface 219 extends along the tear drop surface 213 or some other down-facing surface) or various combinations thereof. In various embodiments, the up-facing surface 211 is characterized by a surface roughness substantially less than that of the down-facing surface 209, thereby enabling the up-facing surface 211 to serve as a stabilizing platform for guiding a cutter through the channel 202, the cutter being configured to remove the excess material 217 along a length of the channel 202.

Figure 3A:
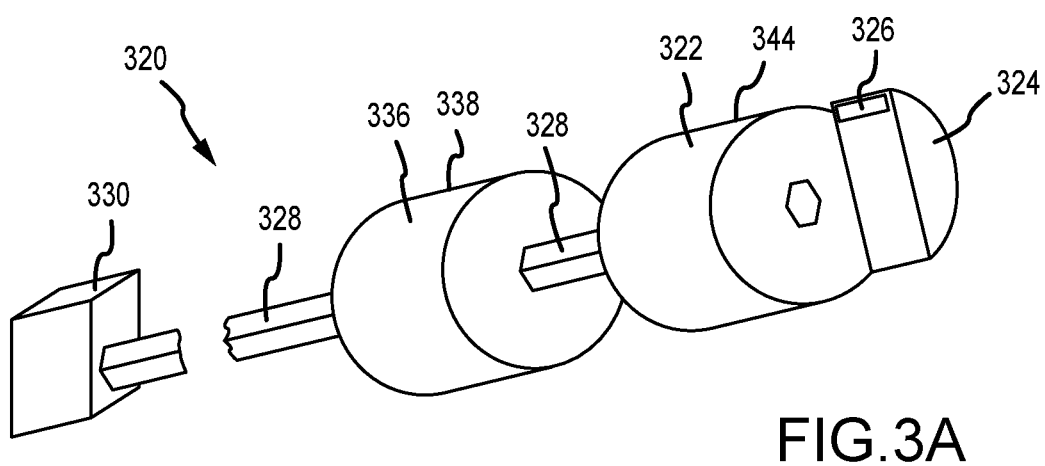
FIGS. 3A, 3B and 3C are perspective, cross sectional and frontal schematic views of an apparatus configured to smooth a surface of a channel exhibiting distortions or surface roughness, in accordance with various embodiments.
Figure 3B:
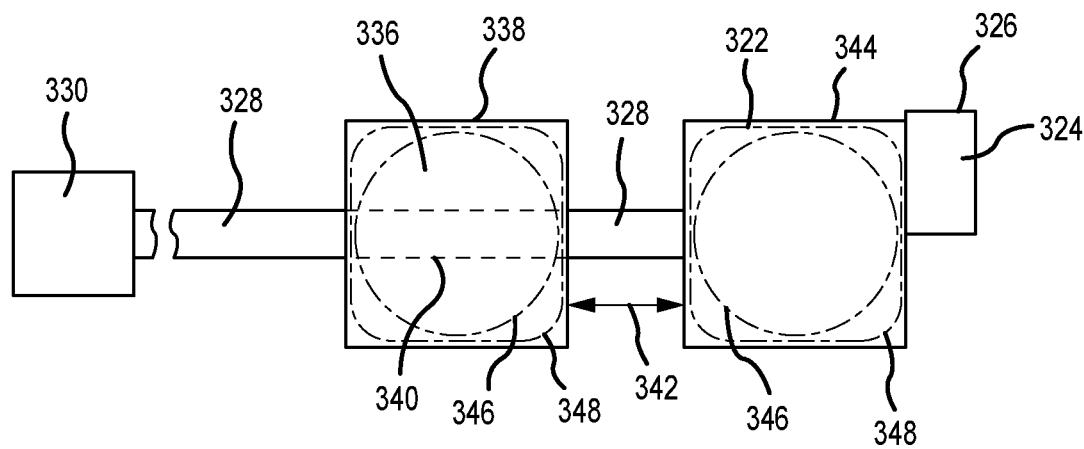
Figure 3C:
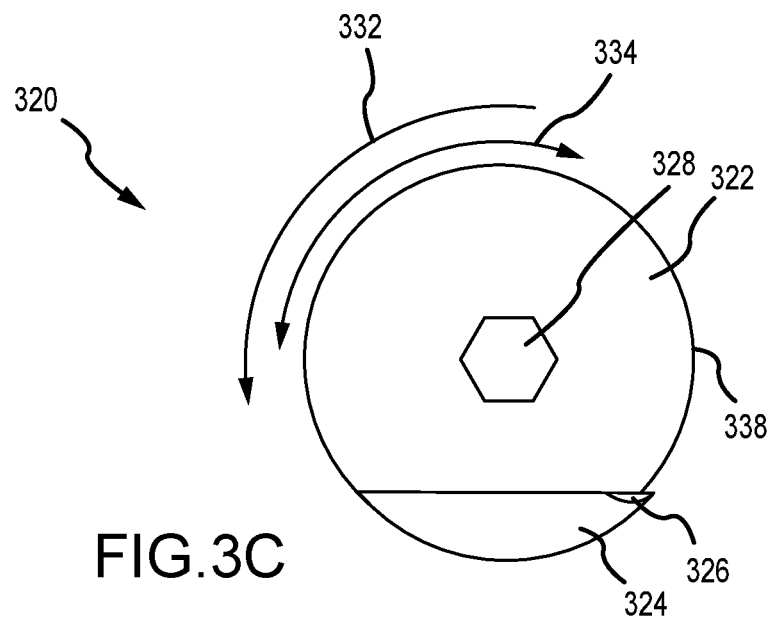

Referring now to FIGS. 3A, 3B and 3C, a cutting system 320 configured to remove excess material along a length of a channel, such as, for example, the excess material 217 along the length of the channel 202 described above with reference to FIGS. 2A-2C, is illustrated. In various embodiments, the cutting system 320 includes a cutter base 322 and a cutter head 324 attached to the cutter base 322. The cutter head 324 may include a cutter blade 326 configured to remove the excess material as the cutter head 324 rotates within the channel. A drive cable 328 extends between a rotary driver 330 (e.g., a motor or gear assembly connected to a motor) and is configured to impart a rotary motion or a torque from the rotary driver 330 to the cutter head 324. In various embodiments, the rotary driver 330 is configured to impart the rotary motion in a single rotary direction 332 (e.g., in a continuous rotary direction with respect to an axis through the drive cable 328) or in a dual rotary direction 334 (e.g., in a washing machine like, back and forth direction with respect to the axis through the drive cable 328). In various embodiments, the dual rotary direction 334 is configured to focus cutting of the excess material proximate a down-facing surface without cutting material proximate an up-facing surface. The single rotary direction 332 may be configured to cut material from both the down-facing surface and the up-facing surface.

Still referring to FIGS. 3A, 3B and 3C, in various embodiments, the cutting system 320 includes a fulcrum 336 disposed at an upstream location of the cutter head 324 (assuming the cutter head 324 progresses in a downstream direction while cutting) and configured to stabilize and position the cutter base 322 and the cutter head 324 within the channel. The fulcrum 336 includes a fulcrum outer surface 338 configured for positioning against an interior surface of the channel following one or both of the down-facing surface and the up-facing surface being cut by the cutter head 324. In various embodiments, the fulcrum 336 further includes a hollow portion 340 configured to receive the drive cable 328 along a length of the fulcrum 336. The hollow portion 340 may be configured to grip the drive cable 328, such that the fulcrum 336 is driven in a rotary direction together with the cutter head 324, or the hollow portion 340 may be oversized with respect to the drive cable 328, such that the fulcrum 336 does not rotate. In both instances, the fulcrum 336 is typically disposed at a distance 342, which may be fixed or variable, sufficient to stabilize the cutter head 324 within the channel. Further, in various embodiments, one or both of the fulcrum outer surface 338 and a cutter base outer surface 344 may have a substantially cylindrical shape, as illustrated, or a rounded shape (depicted by the dashed lines in FIG. 3B). In various embodiments, the rounded shape may be characterized by a sphere 346 or by a cylinder having rounded ends 348 or by various other bodies of revolution in between the two, such as, for example, a football shape. In various embodiments, use of a flexible material in constructing the drive cable 328 will enable the cutting system 320 to navigate curved channels using the up-facing surface as a guide surface. Note that while FIGS. 3A and 3B illustrate the presence of the fulcrum 336 configured to stabilize and position the cutter base 322 and the cutter head 324 within the channel, in various embodiments, the fulcrum 336 may be eliminated from the cutting system 320.

Figure 4A:
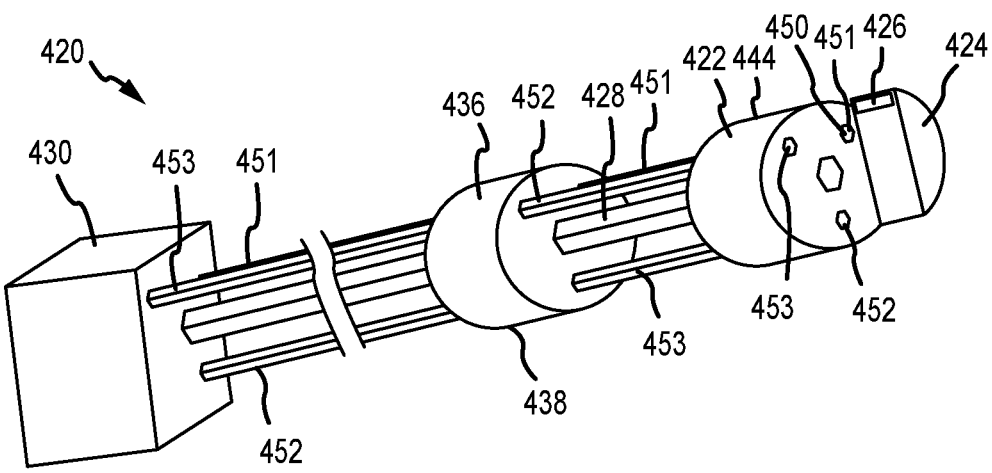
FIGS. 4A, 4B and 4C are perspective, cross sectional and frontal schematic views of an apparatus configured to smooth a surface of a channel exhibiting distortions or surface roughness, in accordance with various embodiments.
Figure 4B:
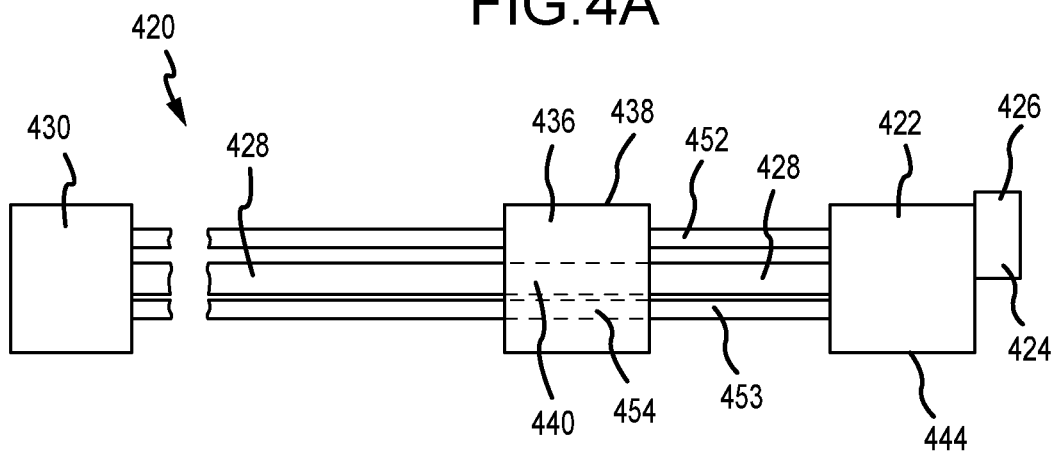
Figure 4C:
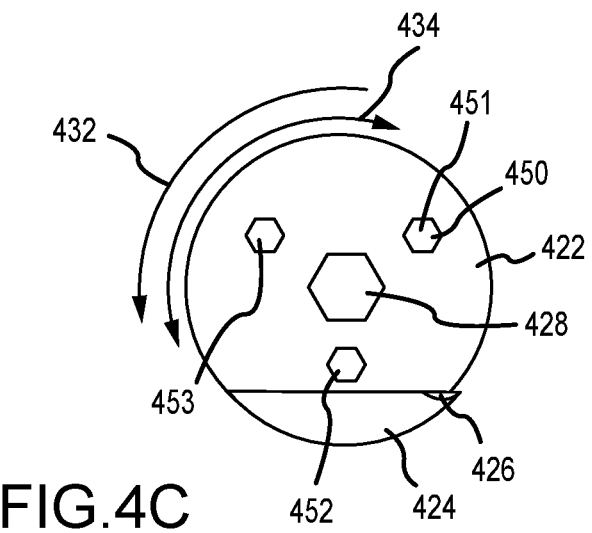

Referring now to FIGS. 4A, 4B and 4C, a cutting system 420, configured to remove excess material along a length of a channel, such as, for example, the excess material 217 along the length of the channel 202 described above with reference to FIGS. 2A-2C, is illustrated. In various embodiments, the cutting system 420 includes a cutter base 422 and a cutter head 424 attached to the cutter base 422. The cutter head 424 may include a cutter blade 426 configured to remove the excess material as the cutter head 424 rotates within the channel. A drive cable 428 extends between a rotary driver 430 (e.g., a motor or gear assembly connected to a motor) and the cutter base 422 and is configured to impart a rotary motion or a torque from the rotary driver 430 to the cutter head 424. In various embodiments, the rotary driver 430 is configured to impart the rotary motion in a single rotary direction 432 (e.g., in a continuous rotary direction with respect to an axis through the drive cable 428) or in a dual rotary direction 434 (e.g., in a washing machine like, back and forth direction with respect to the axis through the drive cable 428). In various embodiments, the dual rotary direction 434 is configured to focus cutting of the excess material proximate a down-facing surface without cutting material proximate an up-facing surface. The single rotary direction 432 may be configured to cut material from both the down-facing surface and the up-facing surface, though, in various embodiments, the single rotary direction 432 may likewise be configured to focus cutting of the excess material proximate the down-facing surface without cutting material proximate the up-facing surface.

In various embodiments, the cutting system 420 may include one or more directional cables 450 (or a directional cable), such as, for example, a first directional cable 451, a second directional cable 452 and a third directional cable 453. The one or more directional cables 450 are configured to direct the cutter head 424 through the channel and to focus the cutting action of the cutter head 424 on, for example, the excess material existing proximate a down-facing surface of the channel. In various embodiments, the rotary driver 430 is configured to impart a sinusoidal push-pull action against the one or more directional cables 450 such that the cutter blade 426 is urged against the down-facing surface and is urged away from the up-facing surface. For example, during the single rotary direction 432 mode of operation, the first directional cable 451 may be pulled toward the rotary driver 430 when proximate the down-facing surface, while the second directional cable 452 and the third directional cable 453 are pushed away from the rotary driver 430. Similarly, the first directional cable 451 may be pushed away from the rotary driver 430 while proximate the up-facing surface, while the second directional cable 452 and the third directional cable 453 are pulled toward the rotary driver 430. The push-pull action of the one or more directional cables 450 just described ensures only the region of excess material is removed, while leaving the relatively smooth up-facing surface undisturbed by the cutter blade 426. The sinusoidal push-pull action also ensures a smooth transition as the cutter blade 426 passes between the down-facing surface to the up-facing surface or between various rough surfaces requiring cutting and relatively smooth surfaces that do not benefit from cutting. Further, the sinusoidal push-pull action is applicable to either the single rotary direction 432 mode of operation or the dual rotary direction 434 mode of operation. Note that while the push-pull action described above is beneficial in cutting the down-facing surface while leaving the up-facing surface substantially uncut, the disclosure contemplates the push-pull action being configured, in various embodiments, to cut both the down-facing surface and at least some or all of the up-facing surface as well. Cutting some or all of the up-facing surface may prove beneficial in various situations, particularly where there exist large distortions of the component or where a portion of the channel is required to me moved to a specific location relative to a reference location following the additive manufacturing process.

Still referring to FIGS. 4A, 4B and 4C, in various embodiments, the cutting system 420 includes a fulcrum 436 disposed at an upstream location of the cutter head 424 (assuming the cutter head 424 progresses in a downstream direction while cutting) configured to stabilize and position the cutter base 422 and the cutter head 424 within the channel. The fulcrum 436 includes a fulcrum outer surface 438 configured for positioning against an interior surface of the channel following one or both of the down-facing surface and the up-facing surface being cut by the cutter head 424. In various embodiments, the fulcrum 436 further includes a primary hollow portion 440 configured to receive the drive cable 428 along a length of the fulcrum 436, as well as a secondary hollow portion 454 corresponding to each of the one or more directional cables 450. In various embodiments, the primary hollow portion 440 is configured to grip the drive cable 428, such that the fulcrum 436 is driven in a rotary direction together with the cutter head 424. Similarly, in various embodiments, the secondary hollow portion 454 corresponding to each of the one or more directional cables 450 is configured to grip each of the one or more directional cables 450 such that they also rotate together with the cutter head 424. In various embodiments, each of the one or more directional cables 450 is configured to slide within the secondary hollow portion 454 that corresponds to each such directional cable to enable the sinusoidal push-pull action described above. Further, in various embodiments, one or both of the fulcrum outer surface 438 and a cutter base outer surface 444 may have a substantially cylindrical shape, as illustrated, or a rounded shape, similar to any of the rounded shapes described above with reference to FIG. 3B.

Figure 5A:
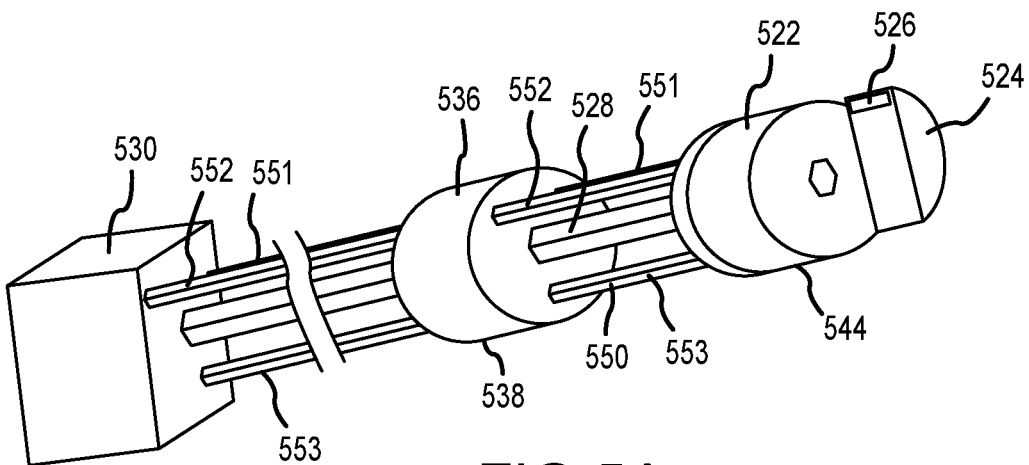
FIGS. 5A, 5B and 5C are perspective and cross sectional schematic views of an apparatus configured to smooth a surface of a channel exhibiting distortions or surface roughness, in accordance with various embodiments.
Figure 5B:
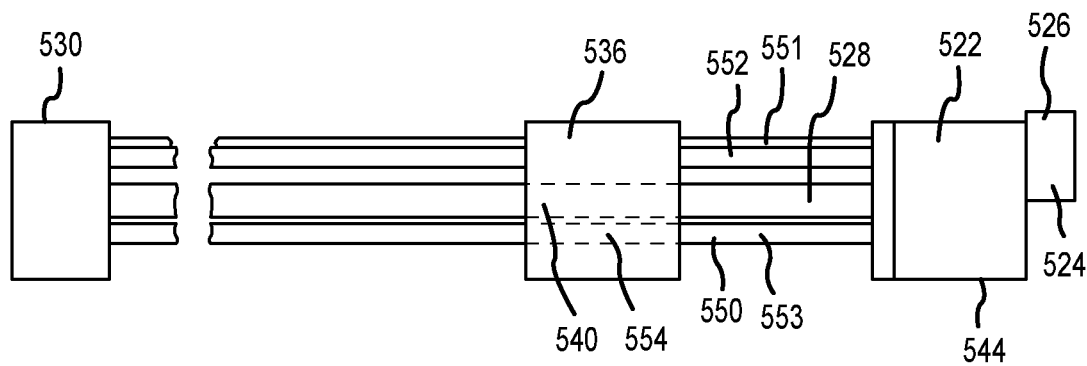
Figure 5C:
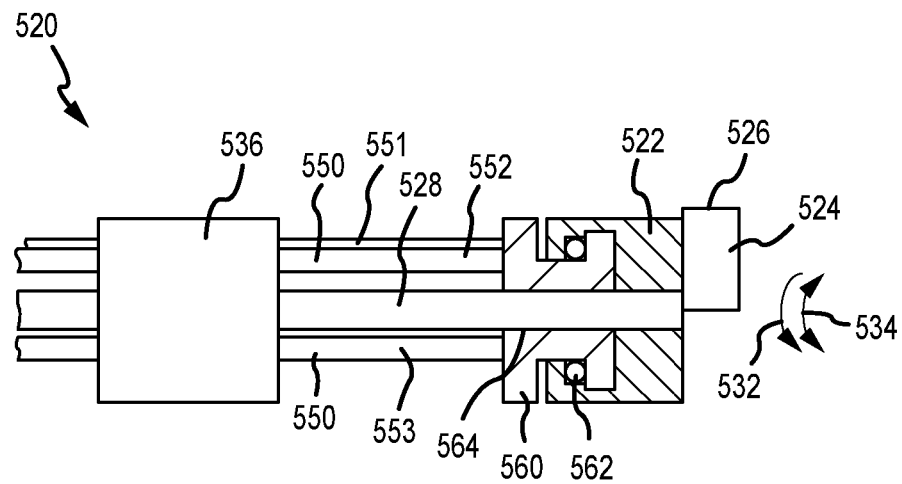

Referring now to FIGS. 5A, 5B and 5C, a cutting system 520, configured to remove excess material along a length of a channel, such as, for example, the excess material 217 along the length of the channel 202 described above with reference to FIGS. 2A-2C, is illustrated. In various embodiments, the cutting system 520 includes a cutter base 522 and a cutter head 524 attached to the cutter base 522. The cutter head 524 may include a cutter blade 526 configured to remove the excess material as the cutter head 524 rotates within the channel. A drive cable 528 extends between a rotary driver 530 (e.g., a motor or gear assembly connected to a motor) and the cutter base 522 and is configured to impart a rotary motion or a torque from the rotary driver 530 to the cutter head 524. In various embodiments, the rotary driver 530 is configured to impart the rotary motion in a single rotary direction 532 (e.g., in a continuous rotary direction with respect to an axis through the drive cable 528) or in a dual rotary direction 534 (e.g., in a washing machine like, back and forth direction with respect to the axis through the drive cable 528). In various embodiments, the dual rotary direction 534 is configured to focus cutting of the excess material proximate a down-facing surface without cutting material proximate an up-facing surface. The single rotary direction 532 may be configured to cut material from both the down-facing surface and the up-facing surface, though, in various embodiments, the single rotary direction 532 may likewise be configured to focus cutting of the excess material proximate the down-facing surface without cutting material proximate the up-facing surface.

In various embodiments, the cutting system 520 may include one or more directional cables 550 (or a directional cable), such as, for example, a first directional cable 551, a second directional cable 552 and a third directional cable 553. The one or more directional cables 550 are configured to direct the cutter head 524 through the channel and to focus the cutting action of the cutter head 524 on, for example, the excess material existing proximate a down-facing surface of the channel. In various embodiments, the rotary driver 530 is configured to impart a sinusoidal push-pull action against the one or more directional cables 550 such that the cutter blade 526 is urged against the down-facing surface and is urged away from the up-facing surface, in a manner similar to that described above with reference to FIGS. 4A-4C.

Still referring to FIGS. 5A, 5B and 5C, in various embodiments, the cutting system 520 includes a fulcrum 536 disposed at an upstream location of the cutter head 524 (assuming the cutter head 524 progresses in a downstream direction while cutting) configured to stabilize and position the cutter base 522 and the cutter head 524 within the channel. The fulcrum 536 includes a fulcrum outer surface 538 configured for positioning against an interior surface of the channel following one or both of the down-facing surface and the up-facing surface being cut by the cutter head 524. In various embodiments, the fulcrum 536 further includes a primary hollow portion 540 configured to receive the drive cable 528 along a length of the fulcrum 536, as well as a secondary hollow portion 554 corresponding to each of the one or more directional cables 550. In various embodiments, the primary hollow portion 540 is oversized with respect to the drive cable 528 such that the fulcrum 536 does not rotate. Similarly, in various embodiments, the secondary hollow portion 554 corresponding to each of the one or more directional cables 550 is oversized with respect to the one or more directional cables 550 such that they are configured to slide within the secondary hollow portion 454 that corresponds to each such directional cable to enable the sinusoidal push-pull action described above. Further, in various embodiments, one or both of the fulcrum outer surface 538 and a cutter base outer surface 544 may have a substantially cylindrical shape, as illustrated, or a rounded shape, similar to any of the rounded shapes described above with reference to FIG. 3B.

Referring more specifically to FIG. 5C, the cutter base 522 is configured to rotate with respect to a cutter pedestal 560 that is itself connected to each of the one or more directional cables 550. A bearing assembly 562 may be disposed between the cutter base 522 and the cutter pedestal to facilitate the relative rotation between the two components. The drive cable 528 extends through an oversized hollow portion 564 within the cutter pedestal 560 and into the cutter base 522, gripping the cutter base 522 such that as the drive cable 528 rotates, the cutter pedestal remains stationary with respect to the drive cable 528, while the cutter base 522 rotates along with the drive cable 528, together with the cutter head 524 and the cutter blade 526. In various embodiments, the one or more directional cables 550 are configured to direct the cutter head 524 through the channel via the push-pull action described above working against the cutter pedestal 560, rather than the cutter base 522. This configuration facilitates rotation of only the cutter base 522 and the cutter head 524, via rotation of the drive cable 528, while the fulcrum 536 and each of the one or more directional cables 550 remain rotationally stationary with respect to the drive cable 528.

Figures 6A, 6B:
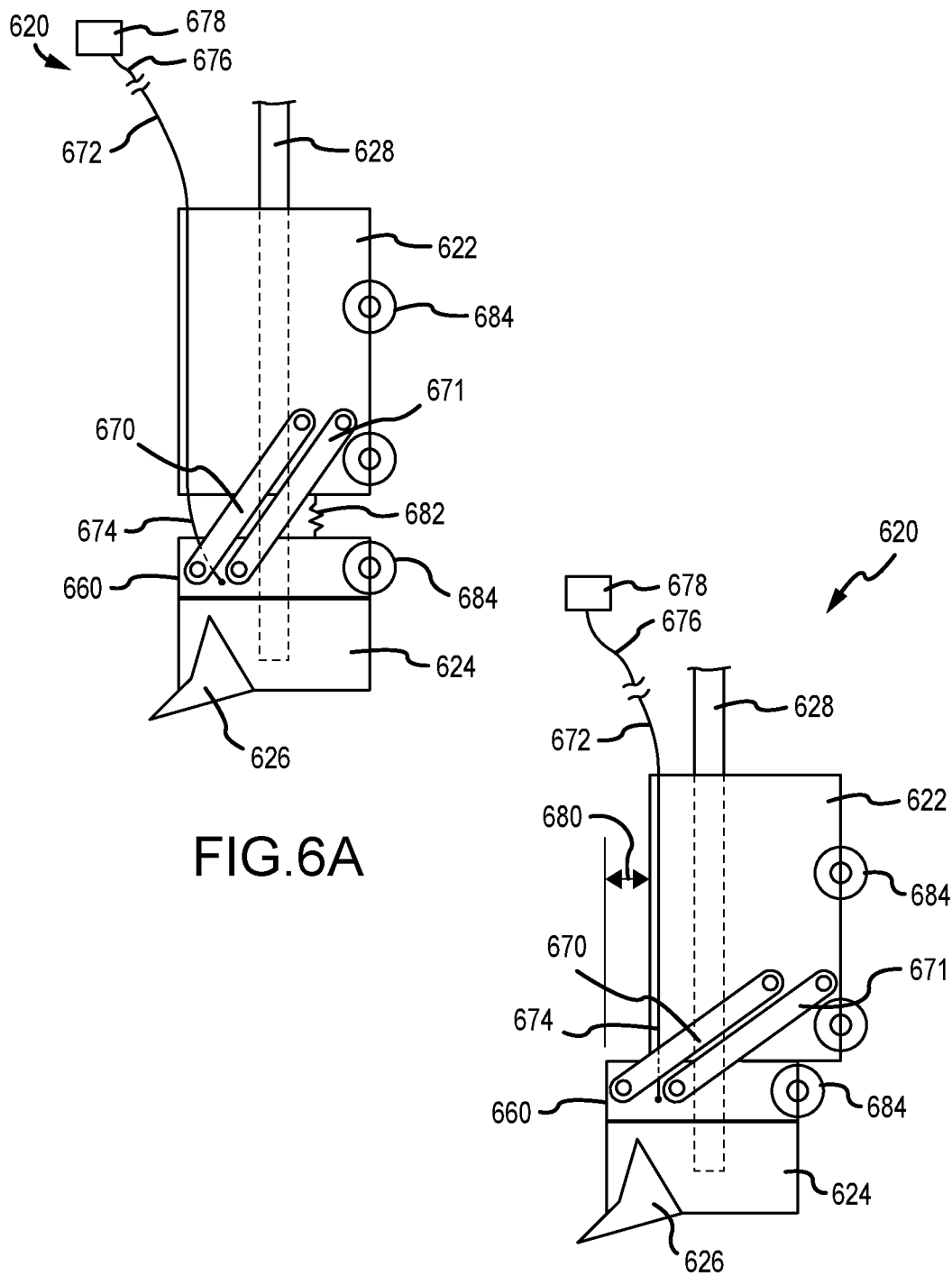
FIGS. 6A and 6B are cross sectional schematic views of an apparatus configured to smooth a surface of a channel exhibiting distortions or surface roughness, in accordance with various embodiments.

Referring now to FIGS. 6A and 6B, a cutting system 620, configured to remove excess material along a length of a channel, such as, for example, the excess material 217 along the length of the channel 202 described above with reference to FIGS. 2A-2C, is illustrated. In various embodiments, the cutting system 620 includes a cutter base 622 and a cutter head 624. Similar to the embodiment described above with reference to FIG. 5C, the cutter head 624 is rotatably attached to a cutter pedestal 660. The cutter pedestal 660 is attached to the cutter base 622 via a hinge, which, in various embodiments, may include one or both of a first hinge 670 and a second hinge 671. The cutter head 624 may include a cutter blade 626 configured to remove the excess material as the cutter head 624 rotates within the channel. A drive cable 628 extends between a rotary driver (e.g., a motor or gear assembly connected to a motor) and the cutter head 624 and is configured to impart a rotary motion or a torque from the rotary driver to the cutter head 624. In various embodiments, the rotary driver is configured to impart the rotary motion in either the single rotary direction or the dual rotary direction as described elsewhere above.

In various embodiments, the first hinge 670 and the second hinge 671 are configured to move or transition the cutter head 624 between a cutting configuration (as illustrated in FIG. 6B) and a non-cutting configuration (as illustrated in FIG. 6A). A cable 672 includes a first end 674 connected to the cutter pedestal 660 and a second end 676 connected to an actuator 678. The actuator 678 is configured to urge the cutting system 620 into the cutting configuration by pulling on the cable 672, thereby urging the cutter pedestal 660 toward the cutter base 622, such that the first hinge 670 and the second hinge 671 force the cutter head 624, rotatably attached to the cutter pedestal 660, to be offset from the cutter base 622 by a cutting distance 680. The actuator 678 is configured to allow the cutting system 620 to return to the non-cutting configuration by releasing the cable 672, thereby allowing the cutter pedestal 660 to move away from the cutter base 622, such that the first hinge 670 and the second hinge 671 force the cutter head 624 back into alignment with the cutter base 622, reducing the cutting distance 680 back to a nominal value (e.g., a value of zero). A spring 682 may be disposed within or proximate the cutter base 622 to urge the cutter pedestal 660 and the cutter head 624 away from the cutter base 622 upon release of the cable 672 by the actuator 678. In various embodiments, one or both of the cutter base 622 and the cutter pedestal 660 may include one or more rollers 684 configured to slide against an interior surface of the channel (e.g., an up-facing surface) to stabilize or guide the cutting system 620 while in either the cutting configuration or the non-cutting configuration.

Figure 7A:
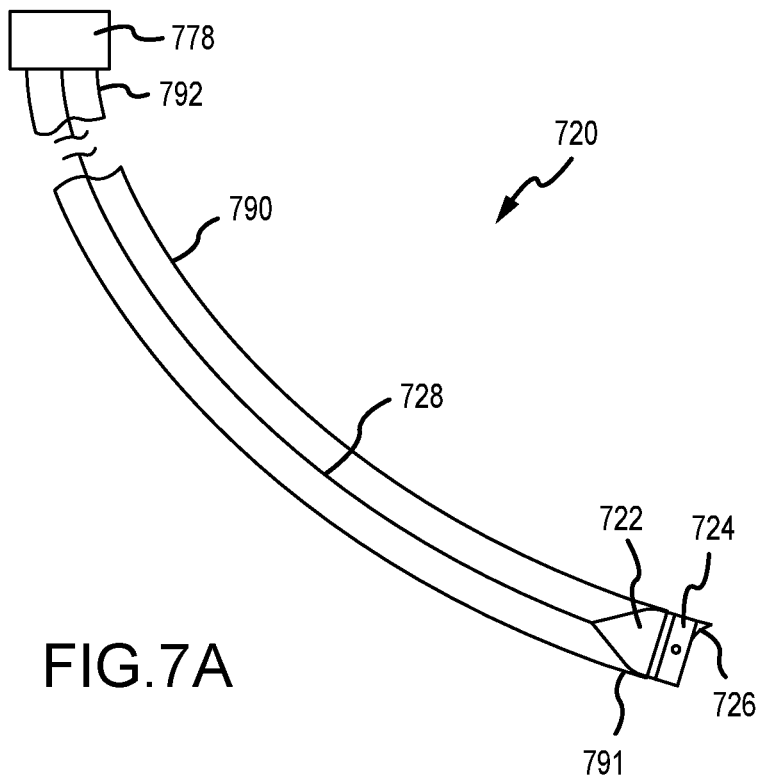
FIGS. 7A and 7B are cross sectional schematic views of an apparatus configured to smooth a surface of a channel exhibiting distortions or surface roughness, in accordance with various embodiments.
Figure 7B:
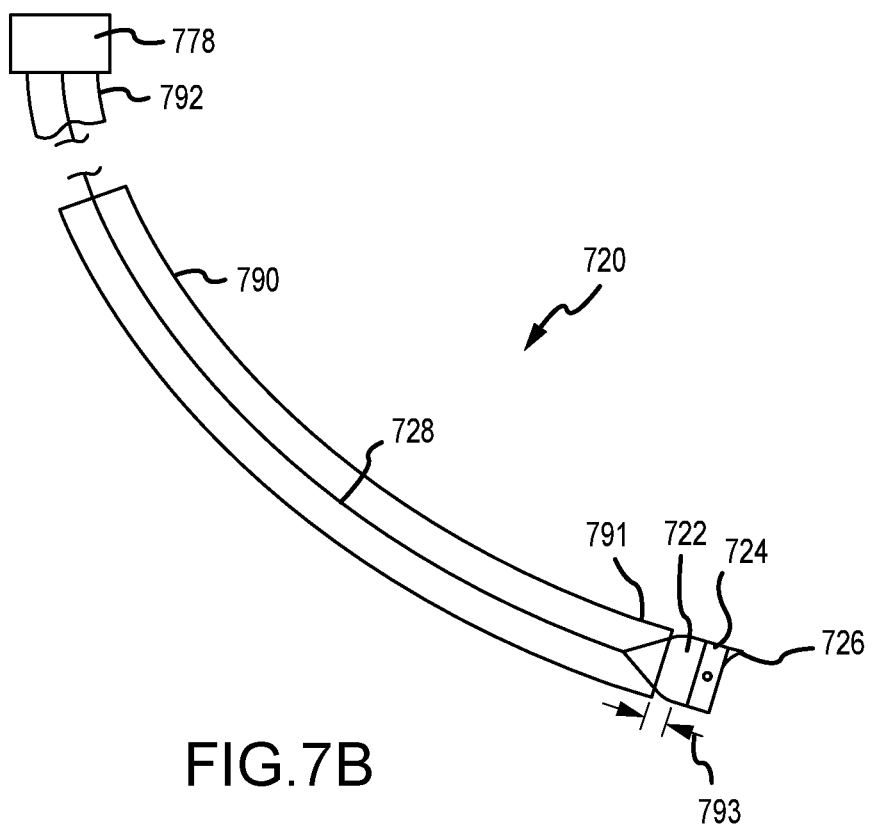

Referring now to FIGS. 7A and 7B, a cutting system 720, configured to remove excess material along a length of a channel, such as, for example, the excess material 217 along the length of the channel 202 described above with reference to FIGS. 2A-2C, is illustrated. In various embodiments, the cutting system 720 includes a cutter base 722 and a cutter head 724 attached to the cutter base 722. The cutter head 724 may include a cutter blade 726 configured to remove the excess material as the cutter head 724 rotates within the channel. A drive cable 728 extends between a rotary driver (e.g., a motor or gear assembly connected to a motor) and the cutter base 722 and is configured to impart a rotary motion or a torque from the rotary driver to the cutter head 724. In various embodiments, the rotary driver is configured to impart the rotary motion in either the single rotary direction or the dual rotary direction as described elsewhere above.

In various embodiments, a housing 790 includes a first end 791 configured to provide a contact or support surface for the cutter base 722 while the cutting system 720 assumes a cutting configuration (as illustrated in FIG. 7A) and to provide a no contact or support surface for the cutter base 722 while the cutting system 720 assumes a non-cutting configuration (as illustrated in FIG. 7B). The housing 790 also includes second end 792 that may be connected to an actuator 778 (or to some other suitable support structure) configured to place an axial load on the drive cable 728 while the cutting system 720 assumes the cutting configuration and to release the axial load while the cutting system 720 assumes the non-cutting configuration. Placing the axial load on the drive cable 728 causes the cutter base 722 to engage the first end 791 of the housing 790, thereby supporting the cutter head 724 and the cutter blade 726 while cutting an interior surface of the channel. Releasing the axial load on the drive cable 728 allows the cutter base 722 to move a distance 793 away from the first end 791 of the housing 790, thereby releasing support for the cutter head 724 and the cutter blade 726, rendering cutting of the interior surface ineffective. In various embodiments, the housing 790 may rotate with the drive cable 729 or remain stationary with respect thereto.

Figure 8:
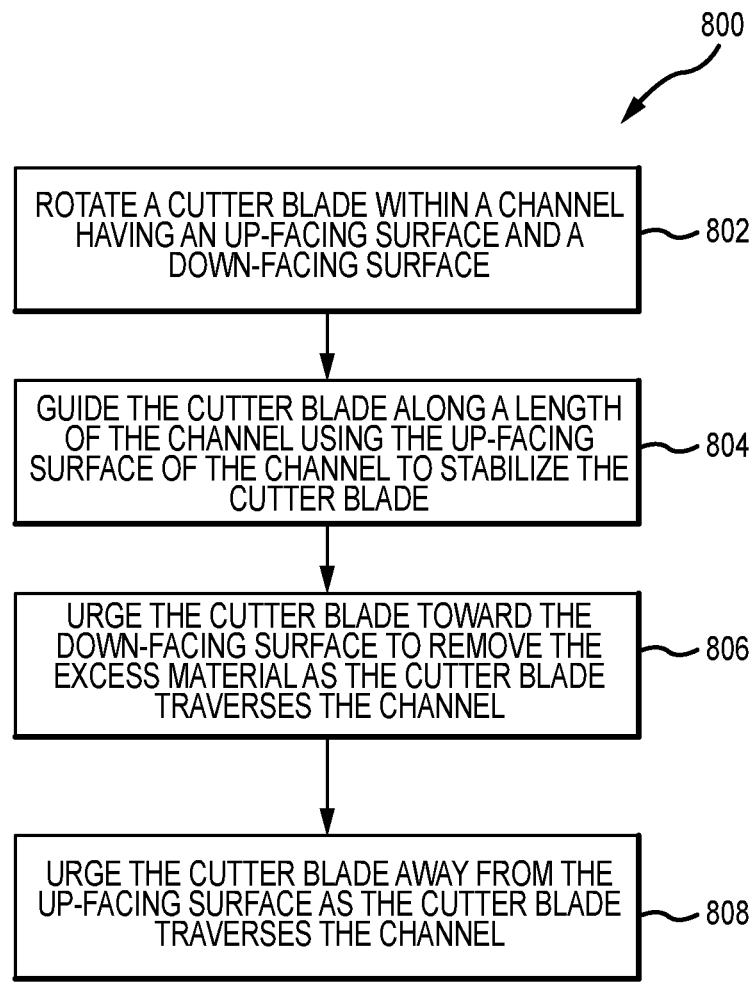
FIG. 8 is a flow chart depicting various steps of a method configured to smooth distortions or surface roughness of an internal channel of an additively manufactured component, in accordance with various embodiments.

Referring now to FIG. 8, a method 800 of removing excess material along a down-facing surface of a channel constructed using an additive manufacturing process is described. In various embodiments, a first step 802 includes rotating a cutter blade within the channel having an up-facing surface and a down-facing surface. A second step 804 includes guiding the cutter blade along a length of the channel using the up-facing surface of the channel to stabilize the cutter blade. A third step 806 includes urging the cutter blade toward the down-facing surface to remove the excess material as the cutter blade traverses the channel. A fourth step 808 includes urging the cutter blade away from the up-facing surface as the cutter blade traverses the channel. In various embodiments, urging the cutter blade toward the down-facing surface and urging the cutter blade away from the up-facing surface includes applying a push-pull action against a directional cable coupled to the cutter blade. In various embodiments, urging the cutter blade toward the down-facing surface comprises transitioning the cutter blade toward a cutter base via a hinge and urging the cutter blade away from the up-facing surface comprises transitioning the cutter blade away from the cutter base via the hinge.

The foregoing disclosure provides apparatus and methods that enable greater design freedom in finishing internal passages or channels disposed within components made using additively manufacturing techniques. The apparatus and methods, in particular, facilitate enhanced uniformity and precision of the channels during finishing processes subsequent to initial fabrication of components via an additive manufacturing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cutting system for removing an excess material along a length of a channel constructed using an additive manufacturing process, comprising:
    a cutter head;
    a cutter blade attached to the cutter head;
    a cutter base connected to the cutter head and having a cutter base outer surface configured to contact an internal surface within the channel to guide the cutter blade against the excess material;
    a drive cable rotatably connected to and configured to rotate the cutter head and the cutter base,
        wherein the cutter base outer surface has a substantially cylindrical shape and the cutter blade extends radially outward of the cutter base outer surface; and
    a fulcrum having a central hollow portion configured to receive the drive cable along a length of the fulcrum.

2. The cutting system of claim 1, wherein the internal surface is an up-facing surface resulting from the additive manufacturing process.

3. The cutting system of claim 2, wherein the excess material is disposed on a down-facing surface resulting from the additive manufacturing process.

4. The cutting system of claim 1, wherein the fulcrum is disposed upstream of the cutter head.

5. The cutting system of claim 1, wherein the fulcrum is configured to rotate with the drive cable.

6. The cutting system of claim 1, further comprising a directional cable configured to direct the cutter head through the channel.

7. The cutting system of claim 6, wherein the directional cable is configured to urge the cutter head toward the excess material.

8. The cutting system of claim 7, wherein the directional cable is configured to urge the cutter head away from an up-facing surface.

9. The cutting system of claim 8, wherein the directional cable is connected to the cutter base.

10. The cutting system of claim 8, wherein the directional cable is connected to a cutter pedestal.

11. The cutting system of claim 10, wherein the cutter base is configured to rotate relative to the cutter pedestal and the cutter pedestal is configured to remain stationary with respect to the drive cable.

12. A cutting system for smoothing a down-facing surface of a channel constructed using an additive manufacturing process, comprising:
    a cutter head;
    a cutter blade attached to the cutter head;
    a cutter base connected to the cutter head and having a cutter base outer surface configured to contact an up-facing surface within the channel to guide the cutter blade against the down-facing surface;
    a drive cable rotatably connected to and configured to rotate the cutter head and the cutter base, wherein the cutter base outer surface has a substantially cylindrical shape and the cutter blade extends radially outward of the cutter base outer surface; and
    a fulcrum having a central hollow portion configured to receive the drive cable along a length of the fulcrum.

13. The cutting system of claim 12, wherein the cutter head is connected to the cutter base via a hinge connecting the cutter base to a cutter pedestal, the cutter head being rotatably connected to the cutter pedestal.

14. The cutting system of claim 13, wherein the drive cable is connected to the cutter head and the hinge is configured to transition the cutter head between a cutting configuration and a non-cutting configuration.

15. The cutting system of claim 12, further comprising a housing extending along the drive cable and having a first end configured to contact the cutter base while the cutting system assumes a cutting configuration.

16. The cutting system of claim 15, further comprising an actuator configured to apply an axial load on the drive cable while the cutting system assumes the cutting configuration.

17. The cutting system of claim 16, wherein the housing is configured to rotate with the drive cable.

* * * * *